United States Patent Office 2,853,403
Patented Sept. 23, 1958

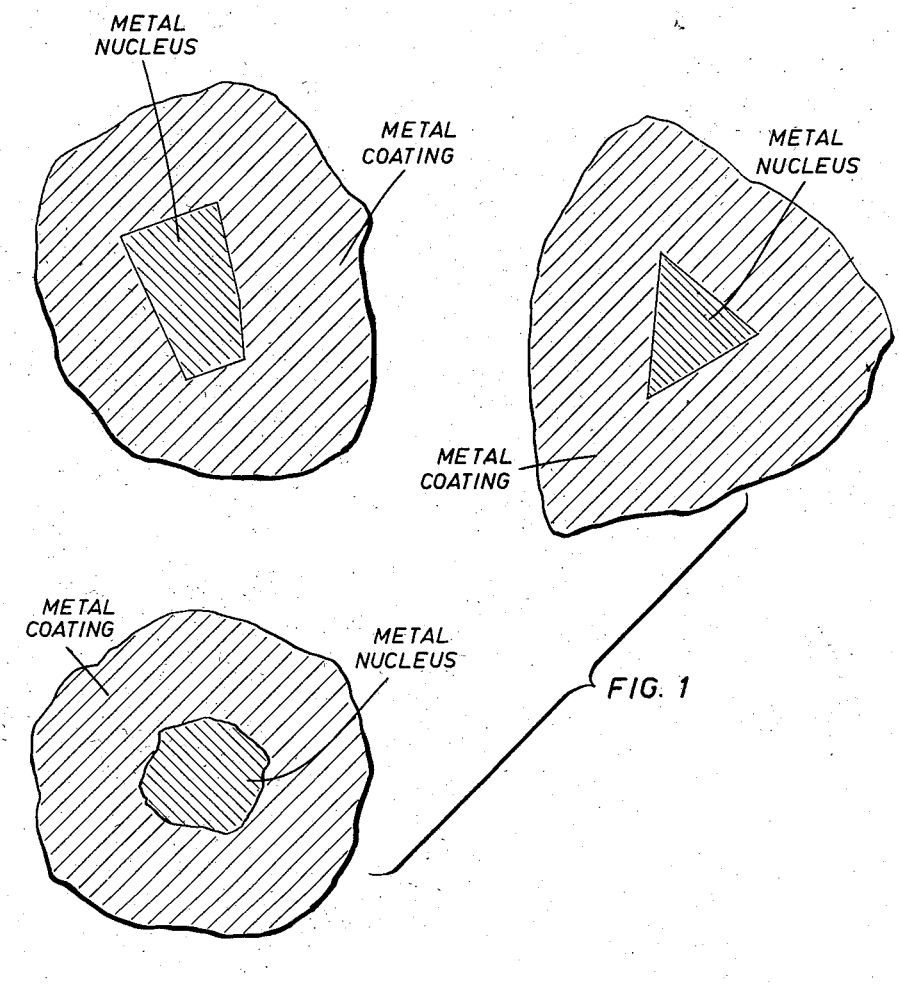
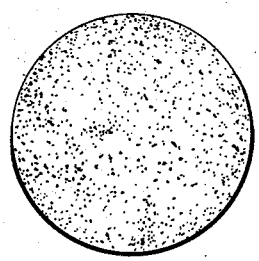
FIG. 1
FIG. 2
Inventors
V.N. MACKIW ~
V. KUNDA ~ J.B. HAWORTH

---

2,853,403

METHOD OF PRODUCING COMPOSITE METAL POWDERS

Vladimir Nicolaus Mackiw, Vasyl Kunda, and John Bryan Haworth, Fort Saskatchewan, Alberta, Canada, assignors to Sherritt Gordon Mines Limited, Toronto, Canada, a company of Canada Application April 11, 1956, Serial No. 577,443

7 Claims. (Cl. 117—100)

This invention relates to a method of producing composite metal powders. The method is particularly directed to producing finely divided composite metal particles comprised of two or more metals having different chemical and/or physical properties by dispersing, in solid form, particles of one or more metals of interest as nuclei in an ammoniated solution in which another metal of interest having different chemical and/or physical properties is present as a soluble salt, and precipitating the latter metal from the solotion by gas reduction to form composite metal particles in which the dispersed metal particles are coated by the precipitated metal.

The use of composite metal powders having different chemical and/or physical properties is well known and they are widely used in industry as such or in the form of compacts, particularly in powder metallurgy. Composite metal powders are used, for example, in alloying in the manufacture of special metal parts, especially small metal parts which cannot be manufactured satisfactorily, conveniently, or economically by conventional melting and casting methods. Also, composite powders in which one metal is coated with a film or coating of a metal having different physical and/or chemical properties are well known and are in widespread use, also in the powder metal industry. Also well known and of increasing importance in the latter industry are pre-alloyed powders in which two or more metals are mixed on an atomic rather than on a macroscopic scale.

Heretofore, composite metal powders have been produced by spraying or sputtering the metals of interest at a temperature above the melting temperature and/or by mechanical attrition and/or by mechanically mixing powders prepared separately. Production of metal powder by spraying is restricted to metals having low melting temperatures and the size of the resulting particles varies over a wide range. Mechanical attrition is slow, costly, and involves the use of fine grinding apparatus such as rod mills, plates, and ball mills, all of which require special, costly grinding media and/or lining. In addition, such methods have the further disadvantage in that they tend to contaminate the purity of the resulting product with particles of the grinding media or of the lining and there is a real danger of oxidation during the comminuting treatments.

We have found that problems heretofore attendant with the production of composite powders can be overcome very easily and very inexpensively. In its simplest form, the method of the present invention contemplates the dispersion, in solid form, of particles of a metal, or of two or more metals, in an ammoniated solution which contains, in solution, a soluble salt of a metal which can be precipitated from the solution as a metal powder by reaction with a reducing gas at elevated temperature and pressure. The mixture of dispersed and precipitated metal particles is agitated sufficiently to hold the dispersed metal particles in suspension in the solution. The temperature of the mixture is increased to and maintained at that temperature at which optimum reduction is obtained and reducing gas is fed into the reaction vessel at a rate sufficient to establish and maintain the partial pressure of reducing gas at which reduction proceeds satisfactorily. The reducing reaction is continued until the dissolved metal salt content of the solution has been reduced to and precipitated as metal powder to the desired extent. The resulting product, in the form of an intimate association of metal particles having different chemical and/or physical properties is separated from the solution, such as by filtering. It is washed and dried and is then in ideal condition for use as such or as a compact prepared by conventional methods.

The term "dispersed metal" used herein is intended to include particles of one or more metals of the group copper, silver, gold, beryllium, zinc, cadmium, boron, aluminum, indium, titanium, germanium, zirconium, tin, hafnium, lead, vanadium, niobium, antimony, tantalum, bismuth, chromium, molybdenum, tungsten, manganese, iron, cobalt, nickel, ruthenium, rhodium, palladium, osmium, iridium, platinum, uranium and thorium. Such "dispersed metals" must be substantially insoluble in ammoniated solution under reducing conditions. They are employed as nuclei in the solution on which precipitated metal can deposit and grow as the reduction proceeds. Thus, the "dispersed metal" particles or nuclei preferably are of a particle size such that they can be held in suspension in the solution during reduction. A preferred particle size is within the range of from about 200 to about 1 micron or smaller.

Metal values which can be precipitated from an ammoniated solution by reaction with a reducing gas at elevated temperature and pressure are those of the group osmium, rhodium, ruthenium, iridium, gold, platinum, palladium, silver, copper, arsenic, tin, nickel and cobalt. Usually, however, these precipitatable metals will be of the group silver, copper, nickel and cobalt. These metals can be precipitated in metallic state as metal powders from an ammoniated solution very rapidly by reaction with a reducing gas at elevated temperature and pressure.

The preparation of composite metal powders containing two or more of the above described group of precipitatable metals can be produced very easily according to the method of the present invention by preparing an ammoniated solution containing dissolved salts of two or more of the desired metals. Reduction is conducted to precipitate first the most easily reduced metal, which is retained in suspension in the solution by agitation. Reduction is then continued to precipitate the next metal in the order of its reducibility. The order of precipitation from an ammoniated solution containing two or more precipitatable metals can be determined readily by the positions of the respective metals in the electromotive series of the elements. For example, the reducibility of the metals silver, copper, nickel and cobalt from an ammoniated solution is in the order named. "Dispersed metals" or nuclei which cannot be precipitated from an ammoniated solution by gas reduction must, of course, be prepared in the desired particle size by known or conventional methods prior to their dispersion in the solution.

The method is conducted very simply. Particles of the "dispersed metals" or nuclei of a particle size such that they can be suspended by agitation in the solution undergoing treatment are dispersed in the ammoniated solution to form a slurry. The metal having physical and/or chemical properties different from those of the "dispersed metal" or nuclei which is to be precipitated from the solution is present in the solution as soluble salt. Factors which affect the reduction and precipitation of metal values from the solution are the nature and characteristics of the metal to be precipitated, the temperature and pressure at which the reducing reaction is conducted, the nature and the characteristics of the solution and the reducing gas employed. All these factors must be taken into consideration and the conditions of operation adjusted to produce optimum precipitation of the desired metal as metal powder.

The desired ratio of the respective metals in the desired composite metal can be obtained very easily. Under normal conditions, dissolved metal values in the ammoniated solution can be reduced to about 1 gram per litre very easily and very rapidly. Thus, it is only necessary to add to the solution a slight excess of the metal values to be precipitated, of the order of about 1 gram per litre, and the desired amount of "dispersed metal" particles. For example, if it is desired to produce a composite metal powder containing about 500 grams of molybdenum and 50 grams of cobalt, the prescribed amount of molybdenum is dispersed in, for example, a litre of an ammoniated solution which contains about 51 grams of cobalt and suspended therein by active agitation. Reduction is continued until only about 1 grame of cobalt remains in the solution. If it is desired to form a composite metal powder comprised, for example, of 70% nickel and 30% copper, an ammoniated solution can be prepared which contains the desired ratio of metals as soluble salts. The solution is then reacted with a reducing gas such as hydrogen at elevated temperature and pressure. Copper precipitates first as metal powder and is retained in suspension in the solution by agitation during precipitation of nickel metal powder. Reduction is continued until the nickel content of the solution has been reduced to the desired extent. The resulting composite metal powder, after separation from the solution, washed and dried, contains the desired nickel to copper ratio.

The solution is selected with regard to the solubility therein of the dispersed metal particles and the metal values to be precipitated and the reactivity of the reducing gas employed. Thus, the solution can be organic or inorganic, acid, basic or neutral, having regard to all the factors entering into the reduction.

Usually, the solution to be treated will be an aqueous ammoniated sulphate or chloride solution.

Ammonia usually is preferred as the complex forming ammine. However, organic ammines such as methyl amines or ethylene diamine can be substituted for all or part of the ammonia.

The reducing gas also is selected with regard to all factors entering into the reducing reaction. Usually, it will be desired to precipitate metals from the solution substantially free from impurities. It is preferred to employ hydrogen as the reducing agent in the precipitation of pure or substantially pure metal from the solution. However, other reducing gases such as carbon monoxide, methane, producer gas, natural gas or mixtures of reducing gases can be employed, if desired.

The anion of the metal to be precipitated is selected with regard to the solubility of the metal salt in the selected solvent and the reactivity of the anion with the reducing gas. Usually, in basic solutions, sulphate, chloride, carbonate and hydroxyl anions and in acid solutions sulphate, fluosilicate or acetate anions can be employed.

The time required for the reducing reaction is a function of the temperature and the pressure at which the reaction is conducted and varies inversely therewith. Preferably, the reaction is conducted at a temperature within the range of from about 250° F. to about 500° F. The reaction can be conducted at a temperature below about 250° F. but it tends to proceed too slowly for large scale commercial operation. Also, the reaction can be conducted at a temperature above about 500° F., but the increased rate of reduction does not warrant the increased cost of the high temperature-high pressure equipment required.

The reducing reaction usually is conducted under a partial pressure of reducing gas above about 50 pounds per square inch, and preferably from about 100 to about 500 pounds per square inch, to produce a total pressure of from about 150 to 1000 pounds per square inch, preferably, from about 250 to 700 pounds per square inch. At partial pressures below about 50 pounds per square inch the reaction proceeds too slowly and the increased rate of the reaction above about 500 pounds per square inch usually does not warrant the cost of the high pressure equipment involved. The term "total pressure" is intended to means the pressure autogenously produced by the temperature at which the reducing reaction is conducted plus the partial pressure or the overpressure of the reducing gas employed.

The concentration of the metal salt in the solution is adjusted to that from which there is rapid precipitation of metal values from the solution but safely below that at which there would be any danger of crystallization in the reaction vessel or in pipe lines, valves, and pumps. For example, in the precipitation of copper as powder metal from solution by gas reduction, copper sulphate is quite soluble in aqueous acid or basic solution, up to about 100 grams per litre of copper at ambient temperature and to a greater extent at higher temperatures. Therefore, concentrations of up to 75 to 100 grams of copper as sulphate per litre can be employed safely. Similarly, nickel and cobalt sulphates are relatively highly soluble in ammoniacal solution and while it is preferred to employ solutions containing about 50 grams per litre, concentrations up to about 75 grams per litre of metal can be employed safely.

In the precipitation of metals from solution by gas reduction, certain metals, such as silver and copper do not require a hydrogenation catalyst to initiate and promote the reducing reaction. Other metals, such as nickel and cobalt require a hydrogenation catalyst. Thus, in the precipitation of nickel and cobalt from solution by gas reduction, it is necessary to provide a hydrogenation catalyst. In certain instances, the dispersed metal serves as a catalyst and it is not necessary to provide another catalyst or nucleating agent in the solution. Examples of metals which serve as a catalyst are iron, nickel, cobalt, molybdenum and titanium carbide. Metals such as chromium, however, do not act as a catalyst in the reduction of nickel and cobalt. In the absence of a catalyst, little or no reduction is obtained and it is necessary to provide it in the solution before initiating the reduction. There are a number of satisfactory addition agents which can be employed as catalysts or nucleating agents of which ferrous sulphate is preferred in the reduction of nickel and a mixture of sodium sulphide and potassium cyanide is preferred in the reduction of cobalt. The addition to the solution of 4 grams per litre or less of the preferred catalyst or nucleating agent is sufficient to initiate and promote reduction of nickel and cobalt from otherwise uncatalyzed solutions.

When precipitating metal powder from solution by gas reduction, the density of the resulting powder can be controlled by regulating the ammonia and/or the ammonium sulphate concentration of the solution. For example, copper metal can be precipitated from solutions of widely varying hydrogen ion contents. Accordingly, the solutions may range from strongly basic amine solutions containing much free ammonia or other amine to those containing relatively large amounts of free acid. It is found, however, that there should be the equivalent of from about 0.1 to 2.5 gram mols of ammonia present in the solution per gram atom of silver or copper or from about 1.5 to 4 gram mols ammonia per gram atom of nickel or cobalt or nickel plus cobalt in the precipitation of silver, copper, nickel and cobalt from solutions by gas reduction.

The desired mixture of metal powders is produced by forming a slurry comprised of the desired amount of dispersed metal particles or nuclei and an ammoniated solution containing, in the form of a soluble salt, the desired amount of metal to be precipitated. This slurry is reacted in a reaction vessel, such as an autoclave, with a reducing gas at elevated temperature and under a partial pressure of reducing gas above the pressure autogenously generated by the temperature at which the reaction is conducted. The reducing reaction is continued until the desired amount of metal powder has been precipitated from the solution. At the end of the reduction period, the mixture of metal particles is separated from the solution, such as by filtration or by centrifuging, and is in ideal condition for use as such or for treatment by conventional means for forming a desired compacted product, such as by sintering and/or compressing according to known methods.

Resulting composite metal particles are illustrated in the accompanying drawing in which:

Figure 1 illustrates enlarged cross-sections through typical composite metal particles; and Figure 2 is a top plan view of a compact formed of composite metal particles illustrated in Figure 1.

The composite particles were of a particle size of about 5 microns.

The following examples illustrate the operation of the present method to produce a mixture of metal particles coated with or otherwise intimately associated with other metal particles having different physical and/or chemical properties. In each example, hydrogen was employed as the reducing gas. The reducing reactions were conducted at a temperature of about 350° F. and under a partial pressure of hydrogen of about 100 pounds per square inch. A finite amount, less than about 4 grams per litre, of ferrous sulphate was added to the solution to promote the reduction of nickel and a finite amount, less than about 4 grams per litre, of a mixture of potassium cyanide and sodium sulphide was added to the solution to promote the reduction of cobalt. The dissolved metals were present in the ammoniated solution as sulphates. The solution contained, in addition to the dissolved salts, from about 0.1 to 2.5 gram mols of ammonia per gram atom of copper and from about 1.5 to about 4 gram mols of ammonia per gram atom of nickel or cobalt or nickel plus cobalt.

ducing a composite powder from which a pre-alloyed powder can be obtained by a simple homogenizing heat treatment. Because of the intimate contact of the different metal surfaces, it is possible to press certain composite metal powders before homogenizing heat treatment and then utilize the sintering operation to obtain the desired degree of diffusion between the metals and thus produce the desired degree of alloy.

In other instances, it may be desirable to delay this alloying treatment by choice until the sintering stage, such as in the use of a pre-alloyed powder with poor pressing properties. The metal conferring the inferior properties to the alloy can be coated with a softer, more ductile metal thereby producing overall good pressing properties and reducing die wear. The ultimate association of the different metals in the mixture and the cold-work introduced during pressure promotes rapid diffusion on sintering and results in a compact with properties at least equal, if not superior to those which have been produced with a pre-alloyed powder.

The invention has the further advantage of replacing older methods of mixing metal powders, such as in double cone mixers, in twin shell mixers, in rod mills and in ball mills according to conventional practice. In many instances, cold-work produced during mixing is objectionable because the powders do not then deform easily during pressing, resulting in lower green densities and increased die wear. This is particularly the case with any form of milling operation. Other deleterious features of the latter form of mixing are, of course, possible contamination of the desired product from the grinding medium and/or the lining of the mill and the danger of oxidation. The cold-work and oxidation produced during milling by conventional methods often makes it necessary to re-anneal the powder and this added considerably to the cost of the raw material.

A further important advantage of the method of the present invention of producing composite metal powders is that a metal which would tend to oxidize easily in attrition or milling can be coated under reducing conditions with a more chemically stable metal to protect it from

| | Composite Metal | Composition of Solution, Grams per litre | | Composition of Product —Composite Metal Powder | Reduction Time, Minutes | Physical Characteristics |
|---|---|---|---|---|---|---|
| | | In Solution | "Dispersed Metal" | | | |
| 1 | Fe+Ni+Co | Ni 23.5, Co 31.5 | Fe 23.5 | Fe:Ni:Co=30:30:40 | 30 | Finely divided composite powder of about 9.6 microns. |
| 2 | Cr+Ni+Co | Ni 11.7, Co 23.5 | Cr 23.5 | Cr:Ni:Co=40:20:40 | 60 | Finely divided composite powder about 12.6 microns. |
| 3 | (Mo+Fe)+Ni | Ni 33 | Mo 14 / Fe 3 | Mo:Fe:Ni=28:6:66 | 10 | Finely divided composite powder about 10.7 microns. |
| 4 | Cu+Ni | Ni 55.5 | Cu 30 | Cu:Ni=35:65 | 130 | Finely divided copper nickel composite powder. |
| 5 | Cr+Ni | Ni 32 | Cr 64 | Cr:Ni=2:1 | 10 | Finely divided composite powder. |
| 6 | Cr+TiC+Ni | Ni 51 | TiC 7 / Cr 14 | Cr:TiC:Ni=20:10:70 | 10 | Do. |

It will be understood that these examples are for the purpose of illustrating the operation of the invention in the preparation of composite powders designed for use as conventional alloys, such as brass, bronze, Monel metal, iron-copper alloys, iron-nickel alloys, nickel-chromium alloys, cobalt-nickel alloys, iron-nickel-cobalt alloys and molybdenum-iron-nickel alloys.

The scope of the method is not limited, of course, to the production of these specific alloys. Rather, it can be employed with advantage in the production of composite powders which include one or more metals described as suitable for use as "dispersed metals" or nuclei and one or more of metals of different physical and/or chemical properties of the group of metals adapted to be precipitated as metal powder from an ammoniated solution by reaction with a reducing gas at elevated temperature and pressure.

The method of the present invention possesses a number of important advantages. It provides a method of prooxidation during subsequent processing. In certain instances, it may be desirable to arrange that the protective metal or a metal added to facilitate sintering can be removed during the sintering operation to leave a pure metal consisting only of the metal or metals of the nucleus.

What we claim as new and desire to protect by Letters Patent of the United States is:

1. The method of producing a composite metal powder comprised of at least two different metals which comprises dispersing solid particles of a metal in an ammoniated solution in which said particles are insoluble under reducing conditions and which contains, in solution, a compound of a metal selected from the group consisting of osmium, rhodium, ruthenium, iridium, gold, platinum, palladium, silver, copper, arsenic, tin, nickel and cobalt and having properties which are different from those of the dispersed metal particles, reacting the solution with a reducing gas at a temperature above about 200° F. and under a positive partial pressure of reducing gas to precipitate from said solution particles of metal in elemental form on said dispersed metal particles, continuing the reducing reaction to coat said dispersed metal particles with said precipitated metal, and thereafter separating and recovering composite metal particles from the solution, said dispersed metal particles being present in said solution during the reducing reaction in amount sufficient to form, with said precipitated metal powder, a composite metal powder adapted to be compacted.

2. The method of producing a composite metal powder comprised of at least two different metals according to claim 1 in which solid particles of at least one metal selected from the group consisting of copper, silver, gold, beryllium, zinc, cadmium, boron, aluminum, indium, titanium, germanium, zirconium, tin, hafnium, lead vanadium, niobium, antimony, tantalum, bismuth, chromium, molybdenum, tungsten, manganese, iron, cobalt, nickel, ruthenium, rhodium, platinum, palladium, osmium, iridium, uranium and thorium are dispersed in the ammoniated solution subjected to the reducing reaction.

3. The method of producing a composite metal powder comprised of at least two different metals according to claim 1 in which the dissolved metal compound is a member of the group consisting of silver, copper, nickel and cobalt.

4. The method of producing a composite metal powder comprised of at least two different metals according to claim 1 in which the reducing reaction is continued to obtain composite metal particles which contain a predetermined ratio of dispersed metals to precipitated metal.

5. The method of producing a composite metal powder comprised of at least two different metals according to claim 1 in which a catalyst having a higher reducing potential under reducing conditions than the reducing gas employed is present in the solution subjected to reaction with the reducing gas.

6. The method of producing a composite metal powder comprised of at least two different metals according to claim 1 in which the dissolved metal compound is present in the ammoniated solution as a salt selected from the group consisting of sulphate and chloride.

7. The method of producing a composite metal powder comprised of at least two different metals according to claim 1 in which the dissolved metal compound is present in the ammoniated solution as a salt selected from the group consisting of sulphate and chloride and the reducing reaction is conducted at a temperature above about 200° F. and under a partial pressure of hydrogen above about 50 pounds per square inch.

References Cited in the file of this patent

UNITED STATES PATENTS

| | | |
|---|---|---|
| 521,992 | Sachs et al | June 26, 1894 |
| 2,694,005 | Schaufelberger | Nov. 9, 1954 |
| 2,694,006 | Schaufelberger et al. | Nov. 9, 1954 |
| 2,734,821 | Schaufelberger | Feb. 14, 1956 |
| 2,767,081 | Mackiw et al. | Oct. 16, 1956 |
| 2,790,736 | McLaughlin et al. | Apr. 30, 1957 |

FOREIGN PATENTS

| | | |
|---|---|---|
| 740,797 | Great Britain | Nov. 16, 1955 |